(12) United States Patent
Dissing

(10) Patent No.: US 11,359,661 B2
(45) Date of Patent: Jun. 14, 2022

(54) SCREW WITH TWO SET OF RIBS IN A KNURLED REGION AND USE THEREOF

(71) Applicant: Dissing A/S, Skanderborg (DK)

(72) Inventor: Claus Hornstrup Dissing, Ry (DK)

(73) Assignee: Dissing A/S, Skanderborg (DK)

( * ) Notice: Subject to any disclaimer, the term of this patent is extended or adjusted under 35 U.S.C. 154(b) by 94 days.

(21) Appl. No.: 16/763,251

(22) PCT Filed: Nov. 12, 2018

(86) PCT No.: PCT/DK2018/050296
§ 371 (c)(1),
(2) Date: May 12, 2020

(87) PCT Pub. No.: WO2019/091536
PCT Pub. Date: May 16, 2019

(65) Prior Publication Data
US 2020/0386256 A1    Dec. 10, 2020

Related U.S. Application Data

(60) Provisional application No. 62/584,970, filed on Nov. 13, 2017.

(30) Foreign Application Priority Data

Nov. 13, 2017    (DK) .......................... PA 2017 70856

(51) Int. Cl.
*F16B 25/00*    (2006.01)
*F16B 25/10*    (2006.01)
*F16B 35/06*    (2006.01)

(52) U.S. Cl.
CPC ...... *F16B 25/0057* (2013.01); *F16B 25/0015* (2013.01); *F16B 25/0078* (2013.01); *F16B 25/0052* (2013.01); *F16B 25/103* (2013.01); *F16B 35/065* (2013.01)

(58) Field of Classification Search
CPC .............. F16B 25/0015; F16B 25/0057; F16B 25/0078
USPC ....................................................... 411/411
See application file for complete search history.

(56) References Cited

U.S. PATENT DOCUMENTS 3,630,252 A * 12/1971 Rosan, Sr. .............. F16B 39/10
411/335
3,858,942 A *  1/1975 Humlong .............. B60B 27/023
301/110.5
4,969,785 A * 11/1990 Wright ................ F16B 19/1054
411/34

(Continued)

FOREIGN PATENT DOCUMENTS

DE    102004018068 A1    8/2004
DE    102004018069 A1    8/2004

(Continued)

*Primary Examiner* — Gary W Estremsky
(74) *Attorney, Agent, or Firm* — James Creighton Wray

(57) ABSTRACT

A screw, especially for wood, has a knurled region (10) with two sets (11A, 11B) of ribs (11) that are offset from each other by an azimuth angle. For example, the two sets of ribs extend towards each other from opposite ends (10A, 10B) of the knurled region (10) and are intertwined only in an overlap region (12) that is at the middle of the knurled region.

9 Claims, 2 Drawing Sheets

(56) References Cited

U.S. PATENT DOCUMENTS

| | | | |
|---|---|---|---|
| 5,295,774 A * | 3/1994 | Roberts | B21H 3/027 |
| | | | 411/387.2 |
| 6,000,892 A | 12/1999 | Takasaki | |
| 6,616,391 B1 | 9/2003 | Druschel | |
| 7,988,397 B2 * | 8/2011 | Bodin | F16B 35/048 |
| | | | 411/399 |
| 9,709,086 B2 | 7/2017 | Gong | |
| 2004/0165966 A1 * | 8/2004 | Aukzemas | F16B 5/0208 |
| | | | 411/353 |
| 2007/0237606 A1 | 10/2007 | Takasaki | |
| 2014/0294534 A1 | 10/2014 | Park | |
| 2015/0184685 A1 | 7/2015 | Su | |

FOREIGN PATENT DOCUMENTS

| | | |
|---|---|---|
| DE | 202004011145 U1 | 9/2004 |
| DE | 102005039744 A1 | 3/2007 |
| DE | 102008057678 A1 | 5/2010 |
| EP | 2458233 A1 | 5/2012 |
| EP | 2522864 A2 | 11/2012 |
| WO | 2010034390 A1 | 4/2010 |

\* cited by examiner

SCREW WITH TWO SET OF RIBS IN A KNURLED REGION AND USE THEREOF

This application claims the benefit of Danish Application No. PA 2017 70856 filed Nov. 13, 2017, U.S. Provisional Application No. 62/584,970 filed Nov. 13, 2027 and PCT/DK2018/050296 filed Nov. 12, 2018, International Publication No. WO 2019/091536 A1, which are hereby incorporated by reference in their entirety as if fully set forth herein.

The present invention relates to a screw, especially a wood-screw, with a knurled region.

BACKGROUND OF THE INVENTION

For a proper and smooth driving of a screw into a material, especially a flexible material, such as wood, it is common practice to provide the shank with a knurled region in order to enlarge the hole made by the screw and minimize friction. Various types of knurls exist on screws, for example straight or twisted serrations, single knurled regions or multiple knurled regions, and various shaped of the serrations. Different types have been developed for different materials.

Examples are given in patent documents WO2010/034390, U.S. Pat. Nos. 6,000,892, 6,616,391, 9,709,086, US2007/237606, US2015/184685, US2014/294534, EP2458233, EP2522864, DE102004018069, DE102005039744, DE102008057678, and DE202004011145U1.

However, despite knurls having existed in screws for many years, there is still an ongoing effort for optimizing screws by providing improved knurled regions.

DESCRIPTION OF THE INVENTION

It is the objective of the invention to provide an improvement in the art. In particular, it is an objective to provide a screw with improved capabilities for screwing in fibrous material, especially wood. This objective is achieved with a screw as explained in greater detail in the following. In particular, the screw as described below has an increased milling efficiency in wood and other fibrous material.

The screw comprises a screw-head at a first end of the screw and a shank extending from the screw-head towards an opposite, second end of the screw. The screw has a longitudinal central axis extending between the first end and the second end. A thread is provided on the shank at or near the second end for screwing the screw into a material by a fastening-tool.

Between the thread and the head, a knurled region is provided. The knurled region has a first end and a second end that is opposite to the first end, and a middle that is midway there between. A typical length L of the knurled region relatively to the total length of the screw is in the range of 1-40%.

A first and second set of knurling ribs is provided between the first and the second end of the knurled region, wherein the first set is offset relatively to the second set by an azimuth angle of at least 10°. If the ribs are provided with identical angular distance between neighboring ribs, the offset is typically half this angular distance.

The first set extends from the first end towards the second end but not all the way to the second end. In other words, the ribs of the first set are ending remotely from the second end. For example, when measured along the central axis, the length of the first set of ribs is less than 90% of the length of the knurled region, optionally less than 80% or even less than 70%. The first set and the second set of ribs are intertwined only in an overlap region. As the first set of ribs does not extend to the second end of the knurled region, the overlap region is remote from the second end.

In some embodiments, the second set of ribs extends all the way from the second end to the first end of the knurled region, but the first set extends from the first end only to a position that is remote from the second end. In this case, the overlap region extends from the first end and until the position where the ribs of the first set are ending, which is remote from the second end.

In other embodiments, the second set of ribs extends from the second end towards the first end but not all the way to the first end, so that the overlap region is not only remote from the second end but also remote from the first end of the knurled region. In this case, the two sets of ribs extends towards each other from opposite ends of the knurled region and are intertwined in an overlap region that is remote from both ends. For example, the overlap region is centered at the middle of the knurled region. Optionally, when measured along the central axis, the length of the second set of ribs is less than 90% of the length of the knurled region, optionally less than 80% or even less than 70%.

Optionally, the screw has one or more of the following parameters
- a length of the overlap region in the range of 3-30% of the length L of the knurled region;
- a number of ribs of the first set and/or the second set in the range of 3-12;
- identical number of ribs in the first set and the second set;
- identical angular distance between the ribs in the first set and the ribs in the second set; optionally the offset in the azimuth angle between the first set and the second set is half the angular distance between the ribs;
- the ribs of both sets twisted helically around part of the shank in the knurled region, optionally twisted by a helix angle V1 in the range of 20-75°, optionally 30-60° relatively to the central axis;
- the knurled region is provided in immediate extension of the thread;
- the knurled region is provided at a distance Z remotely from the head, wherein Z is in the range of 5-90% of the length of the screw;
- the ribs have a triangular cross section with an angular span of V2 in the range of 20-90°, for example in the range of 30-80°, or even 40-70°;
- an overall length of the screw in the range 10-1000 mm.

Although, such screw can be used for various materials, especially fibrous materials, the screw is especially useful for screwing into wood.

In some embodiments, the thread extends to the second end. Optionally, the thread has a cutting notch extending longitudinally along the thread, for example parallel with the central axis. In other embodiments, a drill point is provided at the second end smoothen the screwing into the material.

The screw-head has an upper side and an underside. The upper side comprises a tool-receiver for engagement with the fastening-tool.

For countersinking, it can be advantageous if the underside of the screw-head comprises milling ribs or serrations. For example, the underside is flat or tapering or a combination of these, and the milling ribs or serrations are provided on the flat part or the tapering part or on both.

In some embodiments, the surface at the underside of the head is tapered, optionally frusto-conical. Typical values for the tapering angle are 20°-60° with the longitudinal axis. Thus, the tapered area, for example frusto-conical area, spans 40°-120° in total. However, a more rounded tapered surface would also be possible, for example convex tapered surface, including an ellipsoidal or semispherical surface or concavely tapered surfaces. Typically, the tapered surface is a solid of revolution, although, this is not strictly necessary. For example, the tapered surface has a non-circular cross-section in a plane perpendicular to the central axis.

BRIEF DESCRIPTION OF THE DRAWINGS

The invention will be described in more detail with reference to the drawings, in which.

DETAILED DESCRIPTION OF THE INVENTION

Figure 1:
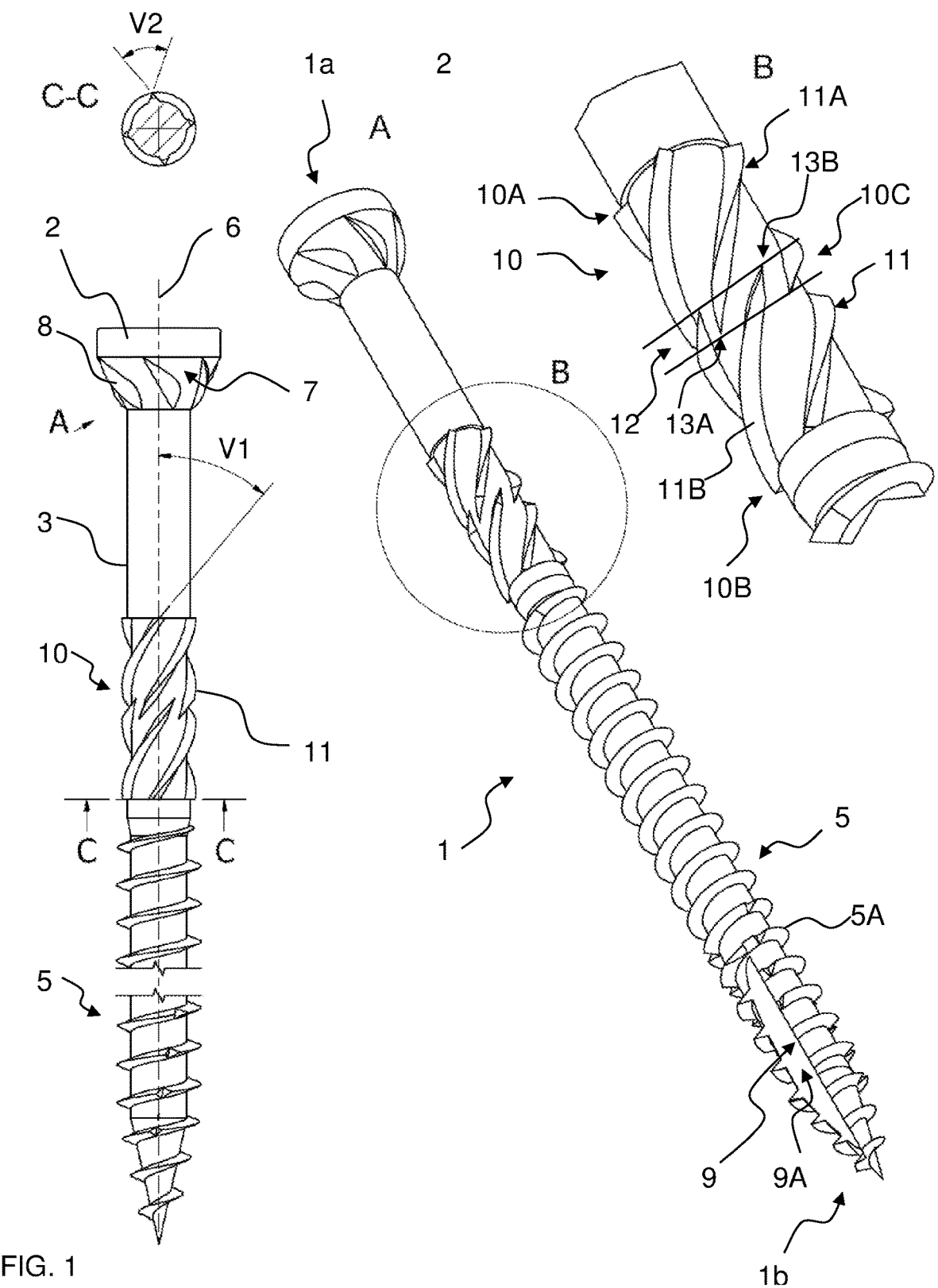
FIG. 1 is an example of a first embodiment of a screw.

FIG. 1 illustrates a screw 1 in various views. The screw 1 comprises a screw-head 2 at a first end 1a of the screw and a shank 3 extending from the screw-head 2 towards an opposite, second end 1b of the screw 1. The screw-head 2 has a tapered surface 7, exemplified as frusto-conical, towards the shank 3. On the underside of the screw-head 2, a plurality of milling-ribs 8 are provided on the tapered surface 7. A thread 5 that extends from the second end 1b is provided on the shank 3 for screwing the screw 1 into a material.

In order for the screw 1 to cut its way easier into the material, the screw 1, optionally, comprises a cutting-edge 9 in the thread 5. The cutting-edge 9 extends along the shaft 3 and is exemplified in FIG. 1 as a notch 9A extending over seven windings 5A of the thread 5 and with sharp edges. The notch 9A could extend over fewer or more windings.

Furthermore, the screw 1 comprises a knurled region 10 on the shank 3 to reduce drag when the screw 1 is driven into the material, for example wood. Screwing into wood causes friction on the shank 3. By adding a knurled region, it mills a hole in the wood which is slightly larger in diameter than the shank, giving more space for the shank 3 to penetrate into the wood. As illustrated in more detail in FIG. 3, the knurled region 10 has an outer diameter D larger than the diameter d of the smooth shank 3 near the screw-head 2 in order to create a hole wider than the shank 3.

A typical length of the knurled region relatively to the total length of the screw is in the range of 1-40%

Typically, the knurled region 10 is provided in immediate extension of the thread 5. With reference to FIG. 1, the knurled region has a first end 10A and an opposite second end 10B and a middle 10C midway between the first end 10A and the second end 10B.

The knurled region 10 comprises a first set 11A of ribs 11 and a second set 11B of ribs 11, the ribs 11 of both sets 11A, 11B are twisted helically around part of the shank 3 in the knurled region 10. The first set 11A of ribs 11 extend from the first end 10A of the knurled region 10 towards the second end 10B and across the middle 10C but not completely to the second end 10B of the knurled region 10. The second set 11B of ribs 11 extends from the second end 10B towards the first end 10A of the knurled region 10 and across the middle 10C but not completely to the second end 10B of the knurled region 10. As the ribs 11 from both sets 11A, 11B are equally long, this results in an overlap region 12 centered around the middle 10C of the knurled region 10.

It is pointed out, however, that the overlap region 12 can be centered closer to the first or the second end 10A, 10B.

The double set of ribs 11 with an overlapping region 12 has an advantage of an increased milling efficiency in wood and other fibrous material.

Figure 2:
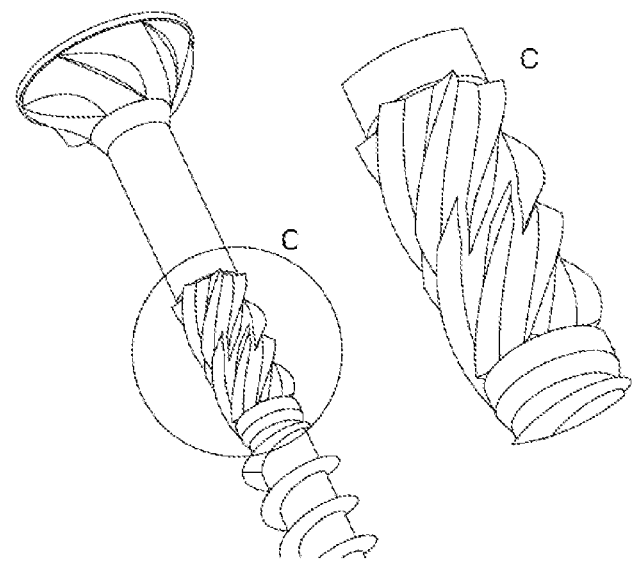
FIG. 2 is an example of a second embodiment of a screw.

The first set 11A of ribs 11 is rotationally offset by an azimuth angle (rotational angle) corresponding to half the angular distance between the ribs 11. For example, the first set 11A of ribs 11 comprises four ribs 11 such that the angle between the ribs is 90°. The offset angle in this case is 45°. However, the number of ribs 11 can vary, as illustrated when comparing the embodiment of FIG. 1 with four ribs 11 in each set 11A, 11B of ribs 11 with the embodiment of FIG. 2 with six ribs 11 in each set 11A, 11B of ribs 11. In the latter case, the angle between neighboring ribs 11A is 60 degrees, why the second set 11B of ribs 11 is rotationally offset by an azimuth angle of 30 degrees relatively to the first 11A set of ribs 11. A typical number of ribs is in the range of 3-12.

In the side view drawing of FIG. 1, an angle V1 is indicated as a measure for the angle between the rib 11 and the central axis 6 of the screw 1. This helix angle is typically in the range of 20-75° for example in the range of 30-60°.

In the cross-section C-C in FIG. 1, the rib 11 is exemplified with a triangular shape having an angular span of V2. This angle V2 is typically in the range of 20-90°, for example in the range of 30-80°, or even 40-70°.

Figure 3:
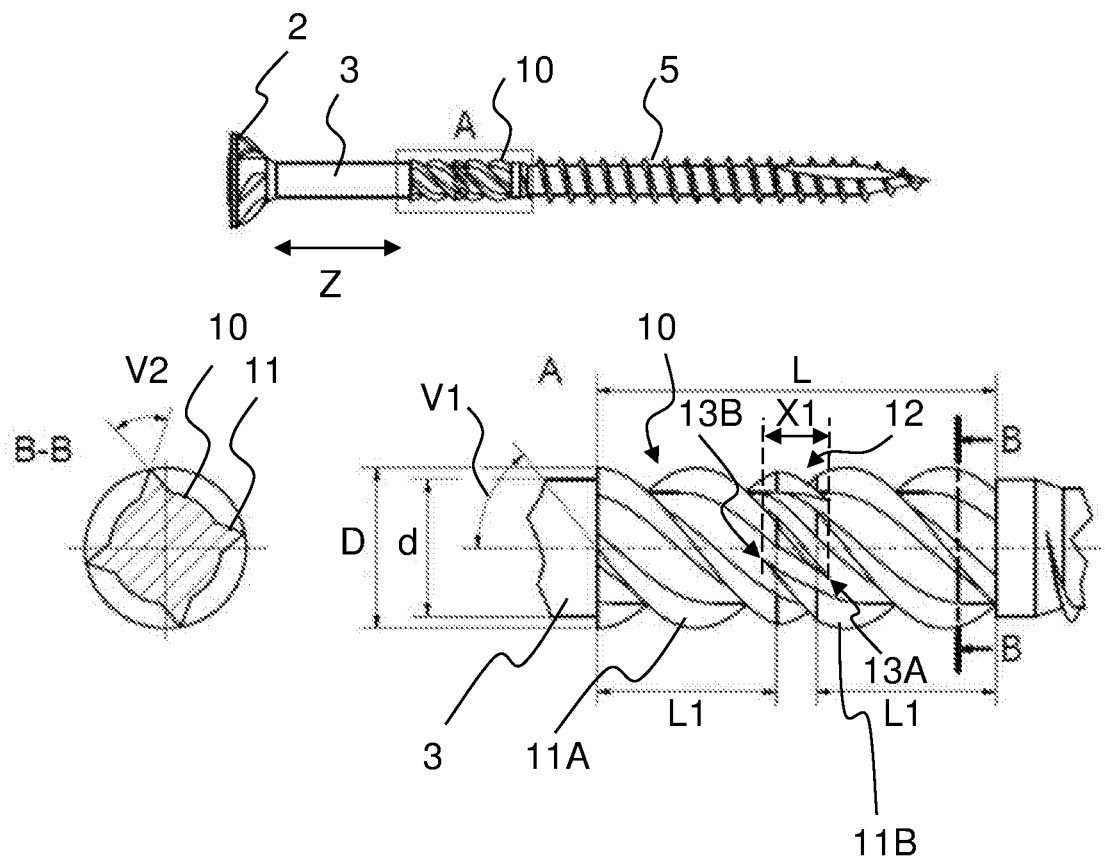
FIG. 3 illustrates the first embodiment with relative parameters.

As illustrated in FIG. 3, the width X1 of the overlap region 12 is substantially shorter than the entire length L of the knurled region 10 and shorter than even half the length L. The width X1 of the overlap region is measured from the respective ends 13A, 13B of the intertwined ribs 11 in the first and second set 11A, 11B. In some embodiments, the width X1 is in the range of 3-30% of L.

In the exemplified embodiment, the overlap region 12 is centered at the middle 10C of the knurled region 10. However, this is not strictly necessary. For example, this overlap region 12 can be offset from the middle, for example by up to 25% of the length of L. However, typically, the offset is such that the ribs 11 from either set 11A, 11B do not extend from one end to the opposite end 10A, 10B of the knurled region 10.

As illustrated in FIG. 3, the ribs 11 decrease in size in the overlap region 12. Also illustrated are distances L1 in which the ribs have constant thickness.

The invention claimed is:

1. A screw (1) comprising a screw-head (2) at a first end (1a) of the screw (1) and a shank (3) extending from the screw-head (2) towards an opposite, second end (1b) of the screw (1); wherein a thread (5) is provided on the shank (3) for screwing the screw (1) into a material; wherein a knurled region (10) is provided between the thread (5) and the screw-head (2), the knurled region (10) having a first end (10A) and a second end (10B); wherein the knurled region (10) comprises a first set (11A) and a second set (11B) of knurling ribs (11), wherein the first set (11A) is offset relatively to the second set (11B) by an azimuth angle of at least 10°; wherein first set (11A) extends from the first end (10A) towards the second end (10B) but not to the second end (10B); wherein the first set (11A) and the second set (11B) are intertwined only in an overlap region (12), which is remote from the second end (10B), wherein the knurled region (10) has a middle (10C) midway between the first end (10A) and the second end (10B), and wherein the overlap region (12) is centered around the middle (10C).

2. A screw according to claim 1, wherein the second set (11B) extends from the second end (10B) towards the first end (10A) but not to the first end (10A) and wherein the overlap region (12) is also remote from the first end (10A).

3. A screw according to claim 1, wherein the ribs (11) decrease in size in the overlap region (12).

4. A screw according to claim 3, wherein the overlap region (12) has a length in the range of 3-30% of a length L of the knurled region (10), wherein the length X1 of the overlap region (12) is measured from the end (13A) of the first set (11A) and the end (13B) of the second set (11B).

5. A process of using the screw of claim 1 including a step of the scew being screwed into wood.

6. A screw (1) comprising a screw-head (2) at a first end (1a) of the screw (1) and a shank (3) extending from the screw-head (2) towards an opposite, second end (1b) of the screw (1); wherein a thread (5) is provided on the shank (3) for screwing the screw (1) into a material; wherein a knurled region (10) is provided between the thread (5) and the screw-head (2), the knurled region (10) having a first end (10A) and a second end (10B); wherein the knurled region (10) comprises a first set (11A) and a second set (11B) of knurling ribs (11), wherein the first set (11A) is offset relatively to the second set (11B) by an azimuth angle of at least 10°; wherein first set (11A) extends from the first end (10A) towards the second end (10B) but not to the second end (10B); wherein the first set (11A) and the second set (11B) are intertwined only in an overlap region (12), which is remote from the second end (10B), wherein the first set (11A) and the second set (11B) have identical number of 3-12 ribs, wherein the ribs (11) the first set (11A) and the second set (11B) have identical angular distance between the ribs (11), wherein the first set (11A) is offset relatively to the second set (11B) by an azimuth angle equal to half the angular distance between the ribs (11).

7. A screw (1) comprising a screw-head (2) at a first end (1a) of the screw (1) and a shank (3) extending from the screw-head (2) towards an opposite, second end (1b) of the screw (1); wherein a thread (5) is provided on the shank (3) for screwing the screw (1) into a material; wherein a knurled region (10) is provided between the thread (5) and the screw-head (2), the knurled region (10) having a first end (10A) and a second end (10B); wherein the knurled region (10) comprises a first set (11A) and a second set (11B) of knurling ribs (11), wherein the first set (11A) is offset relatively to the second set (11B) by an azimuth angle of at least 10°; wherein first set (11A) extends from the first end (10A) towards the second end (10B) but not to the second end (10B); wherein the first set (11A) and the second set (11B) are intertwined only in an overlap region (12), which is remote from the second end (10B), wherein the ribs (11) of both sets (11A, 11B) are twisted helically around part of the shank (3) in the knurled region (10).

8. A screw (1) according to claim 7, wherein the ribs (11) are twisted relatively to the central axis by a helix angle V1 in the range of 20-75°.

9. A screw (1) comprising a screw-head (2) at a first end (1a) of the screw (1) and a shank (3) extending from the screw-head (2) towards an opposite, second end (1b) of the screw (1); wherein a thread (5) is provided on the shank (3) for screwing the screw (1) into a material; wherein a knurled region (10) is provided between the thread (5) and the screw-head (2), the knurled region (10) having a first end (10A) and a second end (10B); wherein the knurled region (10) comprises a first set (11A) and a second set (11B) of knurling ribs (11), wherein the first set (11A) is offset relatively to the second set (11B) by an azimuth angle of at least 10°; wherein first set (11A) extends from the first end (10A) towards the second end (10B) but not to the second end (10B); wherein the first set (11A) and the second set (11B) are intertwined only in an overlap region (12), which is remote from the second end (10B), wherein the intertwined first set (11A) and the second set (11B) of knurling ribs (11) of the knurled region (10) are provided in extension of the thread (5) and only at a distance Z remotely from the screw-head (2), wherein Z is in the range of 5-90% of the length of the screw (1).

* * * * *